United States Patent [19]

Iino

[11] Patent Number: 5,873,251
[45] Date of Patent: Feb. 23, 1999

[54] PLANT OPERATION CONTROL SYSTEM

[75] Inventor: Yutaka Iino, Kawasaki, Japan

[73] Assignee: Kabushiki Kaisha Toshiba, Kawasaki, Japan

[21] Appl. No.: 712,600

[22] Filed: Sep. 13, 1996

[30] Foreign Application Priority Data

Sep. 13, 1995 [JP] Japan ...................................... 7-235590

[51] Int. Cl.$^6$ .................................................. F01K 13/02
[52] U.S. Cl. .......................... 60/660; 60/652; 364/528.26
[58] Field of Search ............................ 60/645, 652, 660; 364/492, 493, 528.21, 528.26

[56] References Cited

U.S. PATENT DOCUMENTS 5,274,571  12/1993  Hesse et al. ............................. 364/493

OTHER PUBLICATIONS

Proceedings of IFAC International conference Adchem '94, pp. 155–158, May 25, 1994, T. Takeshita, et al., "Steam Balance Optimization In Chemical Plant".

IEEE Transaction on Automatic Control, vol. AC–32, No. 10, pp. 851–857, Oct. 1987, Takushi Nishiya, et al., "Basis Factorization Method For Multistage Linear Programming Problems With An Application To Optimal Energy Plany Operation".

Primary Examiner—Noah P. Kamen
Attorney, Agent, or Firm—Oblon, Spivak, McClelland, Maier & Neustadt, P.C.

[57] ABSTRACT

To attain a high efficiency plant production activity and further to contribute to the earth environment protection, the disclosed plant operation control system, comprises means for producing energy in a plant; means for producing products in the plant by use of the energy produced by the energy producing means; means for scheduling energy production on the basis of the production schedule of the products; means for adjusting the energy production scheduled by the energy production scheduling means on the basis of information relative to the energy; and means for outputting the energy outside of the plant according to the energy production schedule adjusted by the energy production schedule adjusting means.

31 Claims, 14 Drawing Sheets

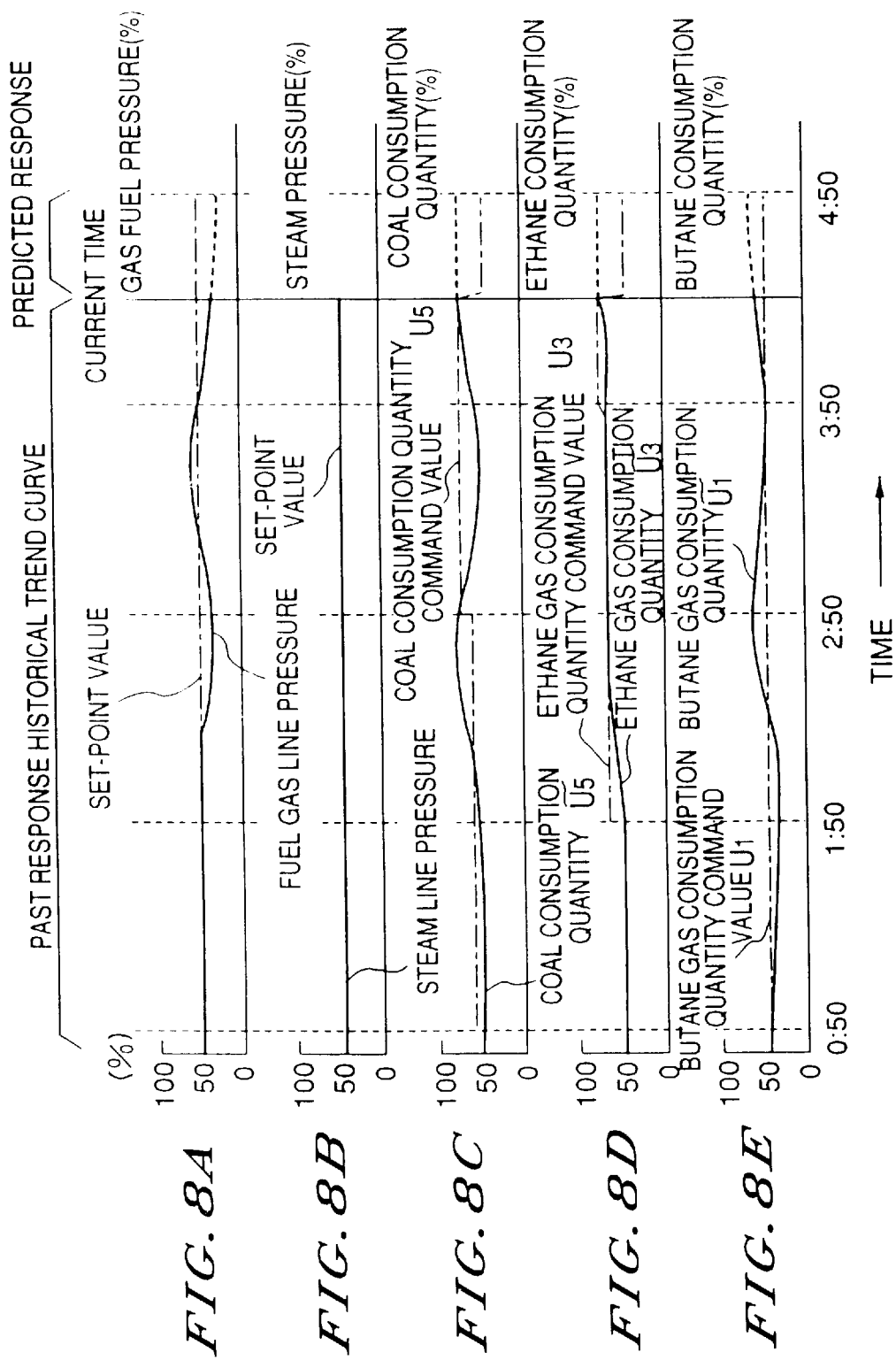

- ELECTRICITY SALE PRICE PREDICTION & DISPLAY FUNCTION(DEMAND QUANTITY)

- PRODUCTION SCHEDULE PLAN & SET FUNCTION

- LOCAL POWER SOURCE DEMAND PREDICTION & DISPLAY FUNCTION

- REPRODUCED FUEL GENERATE PREDICTION & DISPLAY FUNCTION

- OPTIMAL ELECTRICITY SALE QUANTITY CALCULATE & DISPLAY FUNCTION
FIG.12A
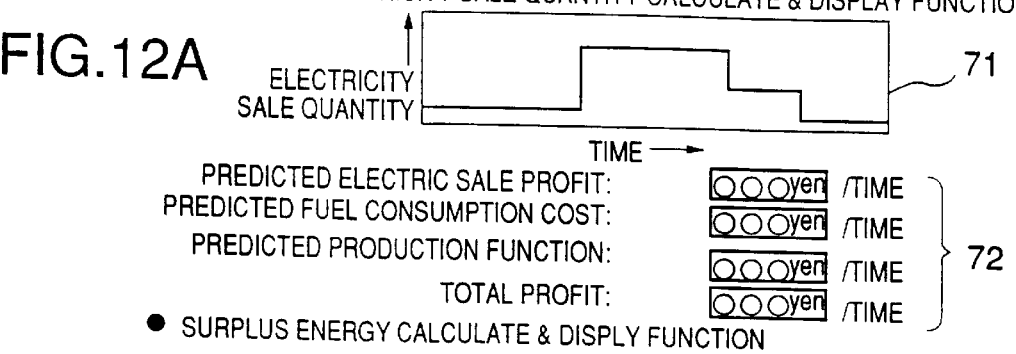
- SURPLUS ENERGY CALCULATE & DISPLY FUNCTION
FIG.12B
- ELECTRICITY TRADE MODE MANAGE PICTURE
FIG.12C
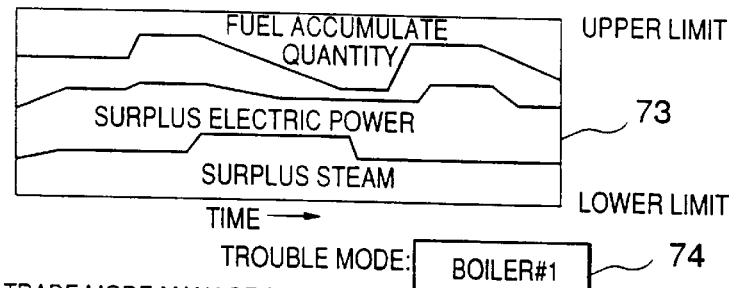
- COST FUNCTION SET PICTURE
FIG.12D

PLANT OPERATION CONTROL SYSTEM

BACKGROUND OF THE INVENTION

1. Field of the Invention

The present invention relates to a plant operation control system, and more specifically to a plant operation control system which can control both producing products and trading electricity cooperatively in various plants provided with a local electric power generating function.

2. Description of the Prior Art

In various industrial plants, such as petroleum refining, petrochemical, iron and steel, cement, paper and pulp, and the like, a large quantity of energy, such as combustible byproducts, steam, heat, and the like, is produced with surplus energy being occasionally discharged to the outside of the plant. One effective method of utilizing the surplus energy is to convert it into electric energy using a private electric power generator so that the generated electric power can be consumed in the plant.

In the various plants, however, since the plant is operated in accordance with a production planning schedule, the energy required for plant production fluctuates according to time. In other words, since the required energy increases or decreases at times determined by the production cycle, a great quantity of surplus energy is inevitably produced temporarily due to the above-mentioned energy demand fluctuations, thus causing a problem in that the plant production cost increases and the plant operation efficiency decreases.

On the other hand, in each electric power company, the power demand fluctuates in a cycle of 24 hours, one week, or one year, and a great amount of labor and energy loss result from attempting to control the electric generating machines and the power systems so as to follow the fluctuations of electric power demand.

Accordingly, if the salable electric energy converted from surplus energy of the various industrial plants can be increased in accordance with the fluctuation of the electric power demand cycle, it is possible to increase the efficiency of electric power production so as to contribute to the protection of the environment.

SUMMARY OF THE INVENTION

With these problems in mind, it is an object of the present invention to provide an industrial plant operation control system which can increase the efficiency of plant production activity while contributing to environmental protection.

To achieve this object, a first aspect of the present invention provides a plant operation control system having means for producing energy in a plant; means for producing products in the plant by use of the energy produced by said energy producing means; means for scheduling energy production on the basis of production schedule of the products; means for adjusting the energy production scheduled by said energy production scheduling means on the basis of information relative to the energy; and means for outputting the energy outside of the plant according to the energy production schedule adjusted by said energy production adjusting means.

Here, it is possible that said energy production schedule adjusting means adjusts the energy production scheduling means on the basis of energy value data.

Further, it is possible that said energy production schedule adjusting means can output a command value for maximizing a total profit relative to both an energy sale profit and a product sale profit.

Further, it is possible that said energy production schedule adjusting means can adjust the energy production schedule according to fluctuations in the energy sale price.

Further, it is possible that said energy production schedule adjusting means comprises means for predicting the energy sale price.

Further, it is possible that said energy production schedule adjusting means comprises means for considering at least one of plant operating conditions, operation constraints, possible trouble conditions, and surplus energy conditions.

Further, it is possible that said energy production scheduling means comprises means for predicting an energy quantity required for producing the products.

Further, it is possible that said energy production scheduling means comprises means for predicting an energy quantity reproduced or recovered in the industrial plant.

Further, a second aspect of the present invention provides a plant operation control system having first means for displaying requirement contents related to a schedule for producing products in the industrial plant by use of energy produced by an energy producing function in the industrial plant; second means for displaying a production schedule for the energy together with the production schedule for the products; third means for displaying information relative to the energy; fourth means for displaying requirement contents related to a schedule required to adjust the energy production schedule on the basis of the displayed information relative to the energy; and fifth means for displaying requirement contents required to output the energy outside of the industrial plant according to the adjusted energy production schedule.

Here, it is possible that said third displaying means is provided with a function of displaying energy value data.

Further, it is possible that said third displaying means is provided with a function of displaying energy price data.

Further, it is possible that said fourth displaying means displays data related to a total plant profit for both the sale of energy and the sale of the product.

Further, it is possible that said fourth displaying means comprises means for adjusting the energy production schedule according to fluctuations of the energy sale price data.

Further, it is possible that said forth displaying means comprises means for displaying predicted contents of the energy sale price data.

Further, it is possible that said forth displaying means comprises means for displaying at least one of plant operation conditions, operation constraints, possible trouble conditions, and surplus energy conditions.

Further, it is possible that said second displaying means comprises means for displaying predicted contents of an energy quantity required for producing the products.

Further, it is possible that said second displaying means comprises means for displaying predicted contents of an energy quantity reproduced or recovered in the plant.

Further, a third aspect of the present invention provides a plant operation control method of producing products in a plant using energy generated within the plant, and scheduling an energy production schedule on the basis of a production schedule of the products; adjusting the energy production schedule on the basis of energy-related data; and outputting part of the energy generated within the plant to the outside of the plant according to the adjusted energy production schedule.

In this invention, energy mainly means electric energy, however, steam energy, fuel gas energy, and coolant energy are also available. Moreover, an energy producing means implies a boiler, turbine, electric generator, heat compressor and the like.

BRIEF DESCRIPTION OF THE DRAWINGS

FIG. 8 is a timing chart showing an example of dynamic control responses obtained by unit control systems of the plant operation control system according to the present invention;

FIGS. 12A to 12D are similar illustrations explaining examples of displayed pictures used for the embodiment shown in FIG. 10.

DETAILED DESCRIPTION OF THE PREFERRED EMBODIMENTS

A first embodiment of the plant operation control system according to the present invention will be described hereinbelow with reference to the attached drawings. FIGS. 1 to 8 show an exemplary petrochemical plant, to which the plant operation control system according to the present invention is applied.

In a petrochemical plant, various petrochemical products are refined from crude oil or naphtha. On the other hand, the basic fuel and the combustible byproducts produced by the production plant are mixed and burnt by an energy supply system (referred to as a utility system, hereinafter). In addition, part of the steam generated by a boiler is consumed by the production plant or steam generated by the production plant is recovered; part of electric power generated by a turbine or a generator is consumed by the production plant; the remaining electric power is sold to an electric power company, an electric power supplying company, an electric power distributing company, or the like (referred to as an electric power company, hereinafter); or electric power is purchased from the electric power company when electric power is not sufficient.

Figure 2:
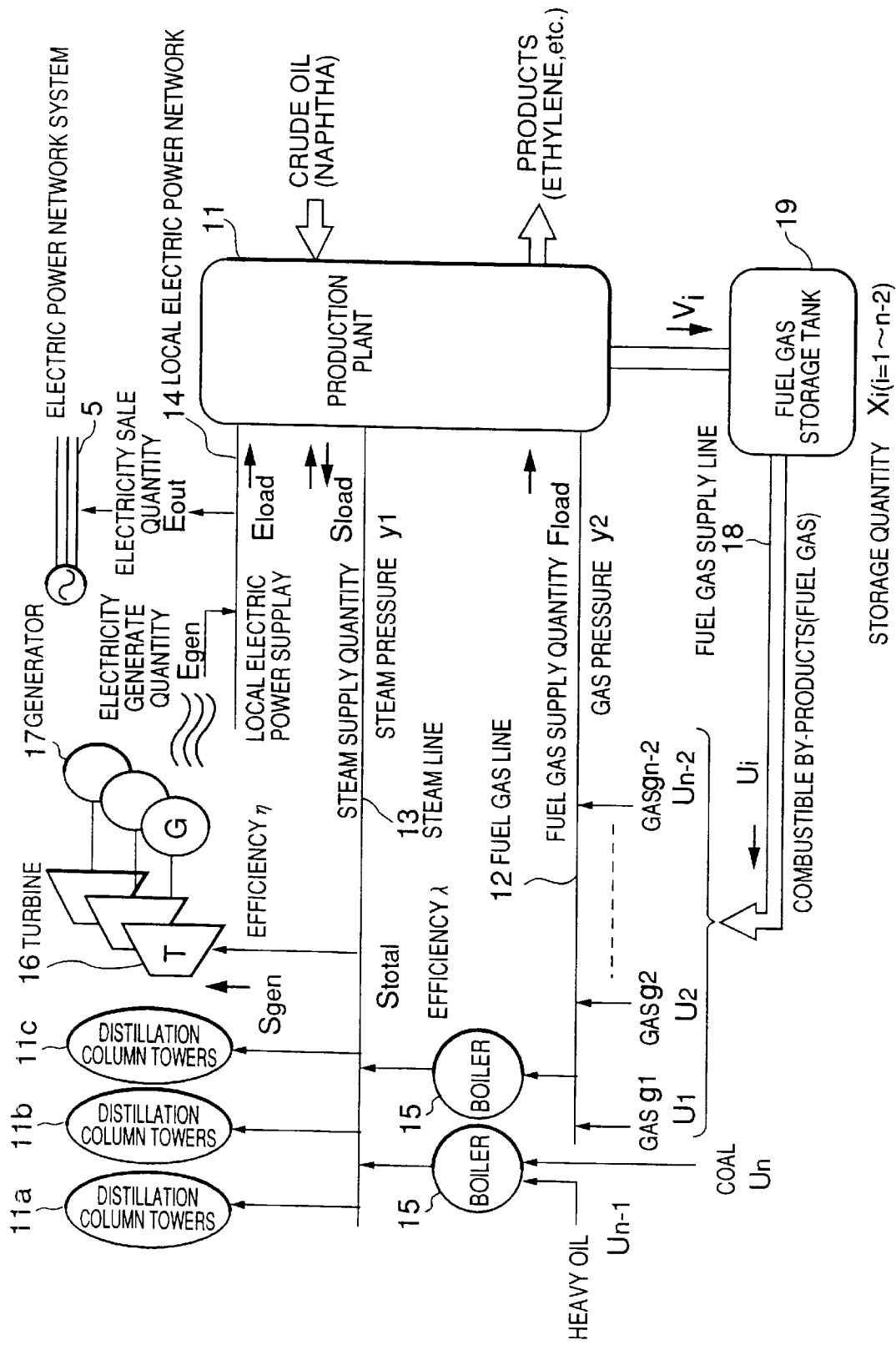
FIG. 2 is a view showing an example of a petrochemical plant.

The construction of this petrochemical plant is shown in FIG. 2, which is mainly composed of a production plant portion 11 and a utility plant portion for supplying fuel gas, steam, and/or electric power, for example.

The utility plant portion is composed of boilers 15, turbines 16, and electricity generators 17. The boilers 15 generate steam by use of a plurality (n−2 types) of fuel gases (combustible byproducts) $g_1$ to $g_{n-2}$ discharged from the production plant and accumulated in a fuel tank 19, coal (coal dust), heavy oil, or waste oil. The generated steam is supplied to a steam line 13. The fuel gases are supplied to a fuel gas line 12. A plurality of turbines 16 and generators 17 generate electric power in response to the steam fed through the steam line 13 and supply the generated electric power to an electric power line 14.

Further, part of the fuel gas is supplied to the production plant through the gas line 12, and part of steam is supplied to the production plant (for example, re-boilers of distillation column towers 11a to 11c) through the steam line 13. Further, part of the electric power is supplied to the production plant as local electric power through the electric power line 14, and the surplus electric power is transmitted to an electric power system 5 of the electric power company (referred to as a sale of electricity, hereinafter). Further, electric power is purchased from the electric power company when necessary, as when electric power demand increases.

Figure 1:
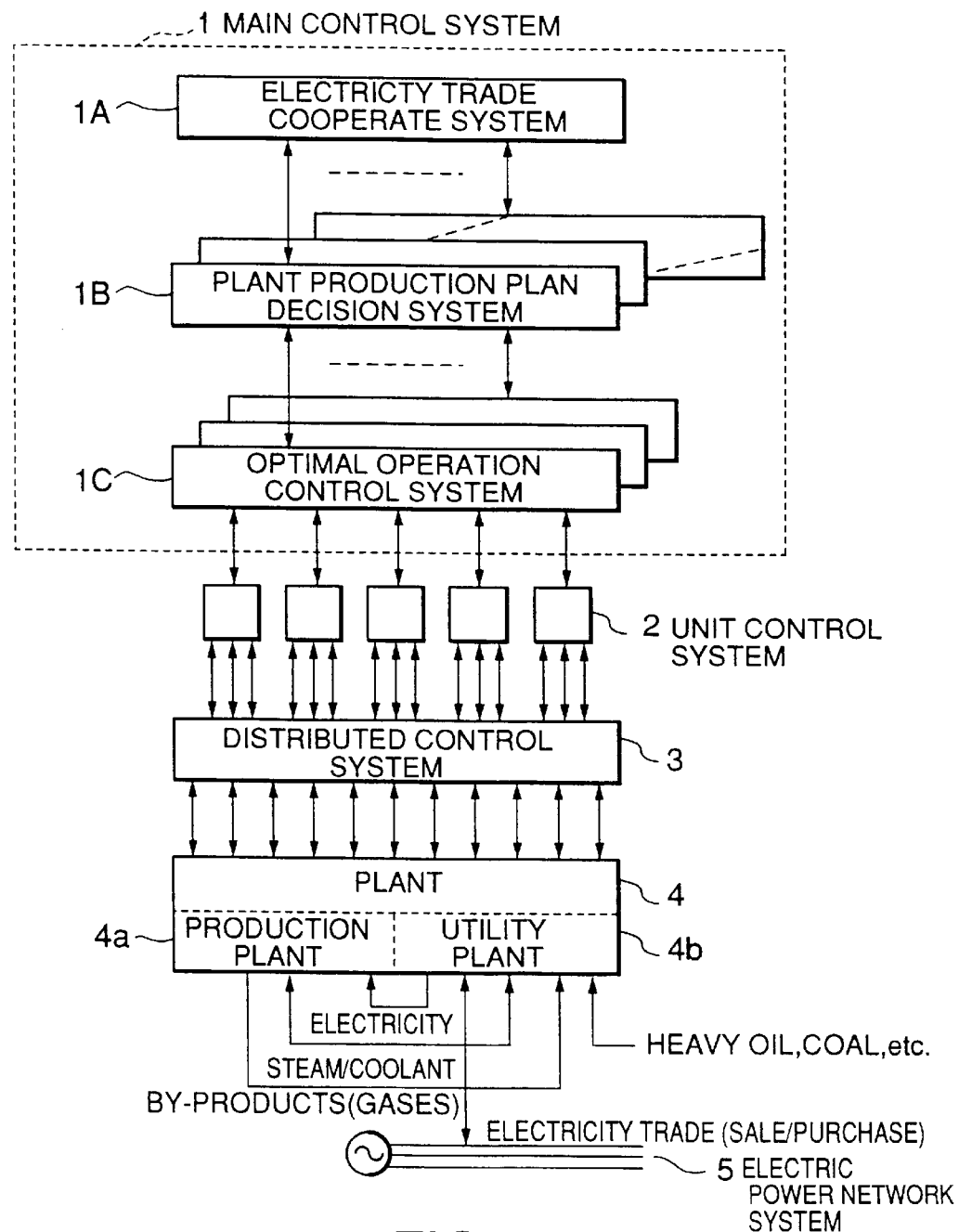
FIG. 1 is a schematic block diagram showing the plant operation control system according to the present invention.

FIG. 1 shows the operation control system according to the present invention constructed as to be applied to the above-mentioned petrochemical plant.

In FIG. 1, the main control system 1 is composed of an electricity trade cooperation system (an upper system) 1A, a plurality of plant production planning decision systems (medium systems) 1B, and a plurality of optimal operation control systems (a lower system) 1C. Further, each optimal operation control system 1C is connected to a plurality of unit control systems 2, each for controlling a unit (an element machine such as a boiler, turbine, electricity generator, or distillation column tower).

Further, all the unit control systems 2 are connected to a distributed control system 3 composed of local control loops each for controlling each process quantity or rate (such as liquid surface level of a boiler drum, an amount of generated steam, or a pressure at a turbine inlet port) by use of each valve. Further, the distributed control system 3 is connected to various valves, sensors, and other elements arranged in the plant 4.

First, the optimal operation control system 1C will be described hereinbelow with reference to FIGS. 2 and 3. In FIG. 2, symbols are defined for formulation of the optimization control calculations as follows: The control period is denoted by τ(min), the current time is represented by k, and the future time i-steps after the current time is represented by k+j as a discrete time.

Unit time supply quantity of each fuel gas $g_1$ to $g_{n-2}$:
$u_1(k+j)$ to $u_{n-2}(k+j)$ (calorie conversion value/min)
Unit time supply quantity of heavy oil:
$u_{n-1}(k+j)$ (calorie conversion value/min)
Unit time supply quantity of coal:
$u_n(k+j)$ (calorie conversion value/min)

Boiler efficiency:

λ(joule/calorie)

Cost of each fuel (n types):

$\alpha_i$(i=1 to n) (cost/calorie)

Storage quantity of each fuel (n types):

$X_i$(i=1 to n) (calorie conversion value)

Upper limit of unit time supply quantity of each fuel (n types):

$u_{imax}$(k+j) (calorie conversion value)

Generation quantity of each fuel gas or tank storage quantity of coal and heavy oil:

$V_i$(i=1 to n) (calorie conversion value)

Unit time supply quantity (demand) of fuel gas to production plant:

$F_{load}$(k+j) (joule/min)

Unit time generation quantity of steam:

$S_{total}$(k+j) joule/min

Unit time supply quantity (demand) of steam to production plant:

$S_{load}$(k+j) joule/min

Unit time steam consumption quantity by turbine:

$S_{gen}$(k+j) joule/min

Electricity generation efficiency of turbine and generator:

η(watt /[joule/min])

Unit time electricity generation rate:

$E_{gen}$(k+j) (watt)

Unit time home electric power consumption quantity:

$E_{load}$(k+j) (watt)

Unit time electricity sale quantity:

$E_{out}$(k+j) (watt)

Electricity sale price:

αe(k+j) (cost/watt×min)

Under the above-mentioned definition, the relational expressions (restriction conditions) established among the respective variables can be given as follows:

Upper and lower limits of each fuel:

$$0 \leq u_i(k+j) \leq u_{imax}(k+j) \quad (i=1 \text{ to } n) \quad (1)$$

Limitation of each fuel storage quantity:

$$X_i(k+j) = X_i(k) - \sum_{ji=1}^{j} u_i(j+jj) + \sum_{ji=1}^{j} v_i(k+jj) \quad (2)$$

$(i = 1 \text{ to } n, j = i \text{ to } i_{max})$ $$X_{imin}(k+j) \leq X_i(k+j) \leq X_{imax}(k+j) \quad (3)$$

$(j = 1 \text{ to } j_{max})$

Fuel gas demand by production plant:

$$F_{load}(k+j) \leq \sum_{i}^{n-2} u_i(k+j) \quad (j = 1 \text{ to } j_{max}) \quad (4)$$

Steam Balance:

$$S_{totalmax} \geq S_{total}(k+j) = \lambda \left( \sum_{i=1}^{n} u_i(k+j) - F_{load}(k+j) \right) \quad (5)$$

$$\geq S_{gen}(k+j) + S_{load}(k+j) (j = 1 \text{ to } j_{max}) \quad (6)$$

Power balance:

$$E_{gen}(k+j) = \eta S_{gen}(k+i) \quad (7)$$
$$= E_{load}(k+j) + E_{out}(k+j) \leq E_{genmax}$$

$$E_{outmin}(k+j) \leq E_{out}(k+j) \leq E_{outmax}(k+j) \quad (j = 1 \text{ to } j_{max}) \quad (8)$$

Evaluation function:

$$J = \sum_{j=1}^{j\max} \left[ \sum_{i=1}^{n} (-\alpha_i \cdot u_i(k+j) + \alpha_e(k+j) \cdot E_{out}(k+j)) \right] \quad (9)$$

The above-mentioned expressions (1) to (8) are balancing conditions for various energies (such as fuels, steam, electric power) of different forms, relational expressions for conversions between the energies, and constraint conditions such as upper limits for energy conversions, and constraints between various variables, all of which represent constraint conditions for optimization calculations. Further, the limiting conditions relative to rate of change for each energy distribution setting value can be determined as follows:

$$\Delta_{imin}(k+j) \leq \Delta u_i(k+j) \leq \Delta u_{imax}(k+j)$$

$$\Delta u_i(k+j) = u_i(k+j) - u_j(k+j-1)(i=1 \text{ to } n)$$

$$\Delta S_{min}(k+j) \leq \Delta S_{total}(k+j) \leq \Delta S_{max}(k+j)$$

$$\Delta S_{total}(k+j) = S_{total}(k+j) - S_{total}(k+j-1)$$

$$\Delta E_{outmin}(k+j) \leq \Delta E_{out}(k+j) \leq \Delta E_{outmax}(k+j)$$

$$\Delta E_{out}(k+j) = E_{out}(k+j) - E_{out}(k+j-1) \quad (10)$$

The above evaluation function (9) implies a profit produced by the utility plant, which can be obtained by subtracting fuel cost from an electricity sale profit. Here, since the plant optimal operation control system is applied to a utility plant, the production profit obtained by the production plant is not included in the above evaluation function (9). However, it is possible to consider the total profit including both the production profit obtained by the production plant and the electricity sale profit obtained by the utility plant.

Figure 3:
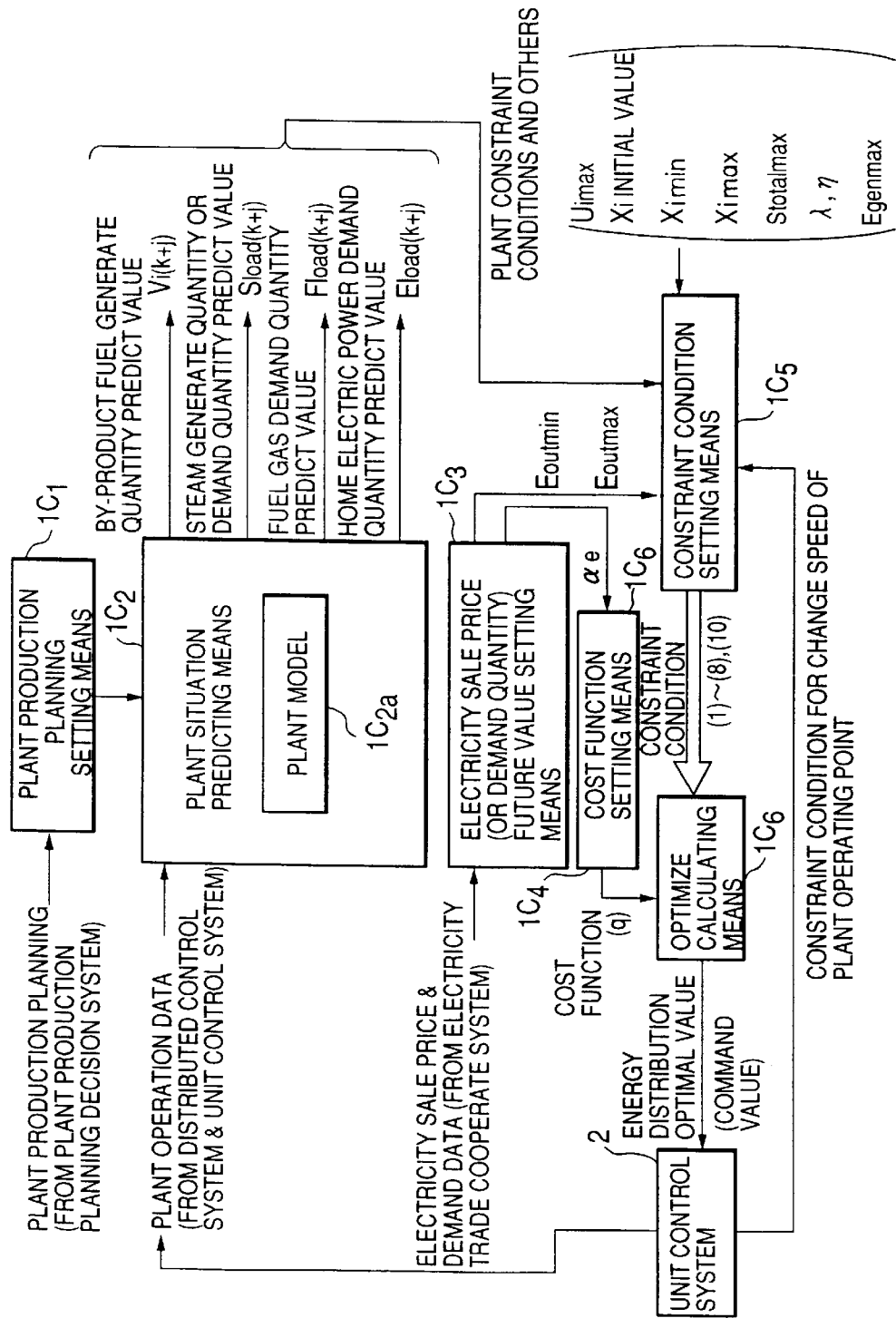
FIG. 3 is a block diagram showing an optimal operation control system according to the present invention.

FIG. 3 shows a construction of the optimal operation control system 1C. Plant production planning setting means 1C, stores plant production planning data, that is, future process quantity set values (future desired values, for example, from the present time to 24 hours from now) transmitted by the plant production planning decision system (the upper system) 1B. Plant situation predicting means $1C_2$ predicts the future generation quantity $v_i$(k+j) of byproducts (fuel gas), steam demand quantity (or generation quantity) $S_{load}$(k+j), fuel gas demand quantity $F_{load}$(k+j), and the local electric power demand quantity $E_{load}$(k+j), on the basis of the plant production planning data given by the plant production planning setting means 1C, and a simulation by use of a plant model $1C_{2a}$. The predicted quantities are transmitted to constraint condition setting means $1C_5$. The constraint condition setting means $1C_5$ inputs other various constraint conditions and plant operating condition change speed limit values as shown by expressions (10) from the unit control systems 2, and prepares the constraint conditions as shown by expressions (1) to (8) and (10). Here, the various constraint conditions are as follows:

Upper limit value of each fuel consumption quantity:

$u_{imax}$(i=1 to n)

Upper limit value of each fuel storage quantity:

$X_{imax}$, $X_{imin}$ (i=1 to n)

Upper limit value of stream generation quantity:

$S_{totalmax}$

Upper limit value of electricity generation quantity:

$E_{genmax}$

Boiler efficiency: λ

Electricity generation efficiency: η

Electric sale price (or demand quantity) future value setting means $1C_3$ receives and stores the sale price of previously sold electricity or the demanded quantity given by electricity trade cooperation system 1A, and transmits the sale price of electricity $\alpha_e(k+j)$, the electricity sale upper and lower limits $E_{outmax}(k+j)$ and $E_{outmin}(k+j)$, for example, to cost fraction setting means $1C_4$ and constraint condition setting means $1C_5$. The cost function setting means $1C_4$ prepares the cost function as shown by expression (9). Optimization calculating means $1C_6$ receives the constraint conditions (1) to (8) and (10) and the cost function (9), and executes optimization calculations in accordance with linear programming or non-linear programming. In the case of the present embodiment, since the cost function and constraint conditions are all linear, linear programming is adopted. Therefore, all the expressions (1) to (10) can be transformed into a matrix and vector expression as follows:

Cost function: $J = cTX$ (11)

Constraint conditions: $AX \geq b$ (12)

where $X = [u_f(k+1) \text{ to } u_n(k+j_{max}), S_{total}(k+1) \text{ to } \ldots,$ $E_{out}(k+1) \text{ to } \ldots ] T$ (X, c and b are vectors, and A is a matrix)

Further, a solution which can maximize the cost function (11) under the constraint condition (12) is calculated in accordance with linear programming. A practical procedure for linear programming is disclosed in "Linear programming" by Hiroshi KONNO, published by NIKKAGIREN (Japanese Science Technology Alliance), for instance.

Further, on the basis of the obtained optimal solution for X, each optimal fuel consumption quantity $u_f(k+j)$ (i=1 to n, j=1 to jmax), the optimal steam generation quantity $S_{total}(k+j)$, (j=1 to jmax), and the optimal electricity sale quantity $E_{out}(k+j)$, (j=1 to jmax) are obtained. Further, the obtained optimal energy distribution values are transmitted to the unit control systems 2 of the respective units (such as boilers, turbines, electric generators, and the like) as command values. The above-mentioned serial processing including the optimization calculations is executed in real time at each control period τ. The above-mentioned respective commands are not only the present desired values but also a series of future desired value responses from the present time k to the future time k+jmax. This is because the preceding control is executed by each unit control system 2 on the basis of the future desired values and in accordance with the model prediction control method, so that the characteristics of the desired values can be improved for each unit.

The optimal operation control system 1C shown in FIG. 3 has been summarized as described above.

Figure 4:
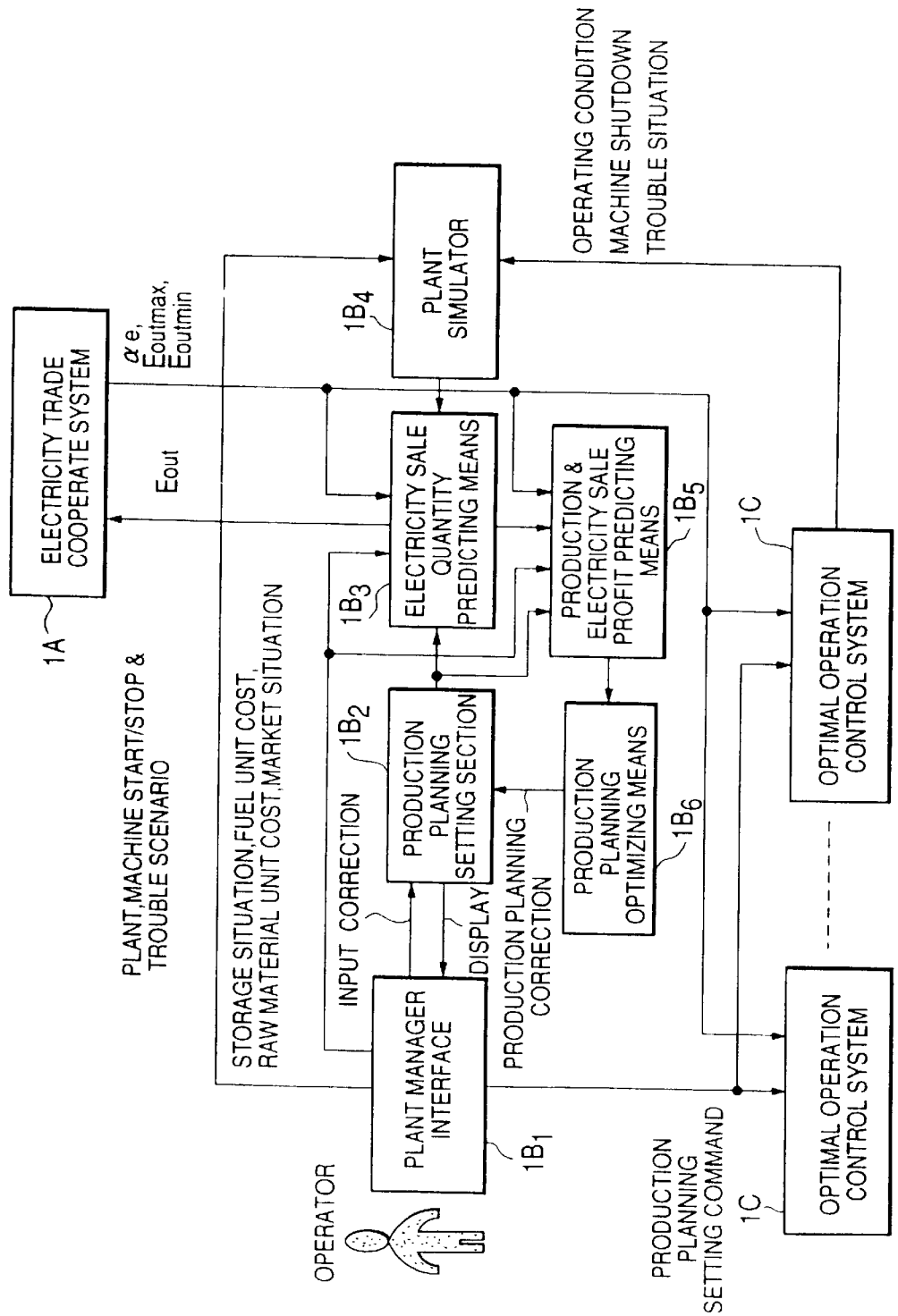
FIG. 4 is a block diagram showing a plant production planning deciding system for the plant operation control system according to the present invention.

The plant production planning system 1B will be described hereinbelow with reference to FIG. 4.

A plant manager interface $1B_1$ can input and display a production planning schedule (plant operation schedule) for operators, and further allows the displayed production planning schedule to be corrected by the operators. Further, the finally decided production planning schedule is transmitted from the plant manager interface $1B_1$ to the optimal operation control system 1C.

A production planning schedule setting section $1B_2$ stores the production planning schedule, that is, the future setting value for each process quantity.

Electricity sale quantity predicting means $1B_3$ calculates the energy distribution and the electricity sale quantity $E_{out}(k+j)$ of the utility plant from the current time to 72 hours from now, on the basis of the production planning data read out of the production planning setting section $1B_2$ and by use of a plant simulator $1B_4$. Here, the operators of the plant manager interface 1B, can set various data (for example, products stock situation, fuel unit cost, raw material unit cost, and market situations). Further, the operators of the plant simulator $1B_4$ can set a scenario related to the start up and shut down of various machines and unexpected troubles, for example, and can further input the current operating conditions, machine operating and stoppage situations, trouble situations, for example (all transmitted from the actual plant side through the optimal operation control system 1C), so that a simulation can be executed on the basis of these various conditions.

Production and electricity sale profit predicting means $1B_5$ calculates a predicted value of the plant operation profit (the total of the production profit and the sale of electricity profit) on the basis of various data such as the energy distribution and the sale of electricity quantity value predicted by the sale of electricity quantity predicting means $1B_3$, the production planing schedule, value information such as fuel unit price and raw material unit price, and the sale of electricity expected price $\alpha_e$ received by the electricity trade cooperation system 1A. The production planning optimizing means $1B_6$ updates the production planning schedule such that the production profit and sale of electricity profit both increase gradually, by slightly altering the production planning data stored in the production planning setting section in accordance with the following procedure:

In step 1: the production planning initial value $X_{(i)}$ is set to i=0, and the corresponding production and sale of electricity profit predicted values are calculated by use of the sale of electricity predicting means $1B_3$, plant simulator $1B_4$, production and sale of electricity profit predicting means $1B_5$.

In step 2: the production planning slight changes $\Delta X_{(j)}$ of m types are decided on the basis of the m-units of generated random numbers.

In step 3: the production and sale of electricity profit predicted values corresponding to the production planning schedule $X_{(i)} + \Delta X_{(j)}$, j=1 to m are calculated in the same way, and the production planning schedule having the maximum profit increasing rate is selected.

In step 4: $X_{(i+1)} = X_{(i)} + \gamma \Delta X_{(j)}$ (where j denotes the production planing change having the maximum profit increasing rate) is set. Here, if $|\Delta X_{(j)}| \leq \epsilon$, the calculation ends. If not, i is set to i+1 and the calculation returns to step 2. Here, $\epsilon$ denotes the optimization calculation convergence threshold value and $\gamma$ denotes the convergence acceleration coefficient ($0 \leq \gamma \leq 1$), both of which can be set by the operators.

The above-mentioned steps are continuously displayed step by step for the operators of the plant manager interface $1B_1$. The operators can accelerate, decelerate, return or interrupt any production planning change by adjusting the parameter γ. Therefore, when a production planning schedule that is satisfactory to the operators is obtained, this production planning data is transmitted to the optimal operation control system 1C. At the same time, the command values of the electricity sale cooperation system 1A, that is, the sale price of electricity $\alpha_e(k+j)$, and the sale price of electricity upper and lower limits $E_{outmax}(k+j)$ and $E_{outmin}(k+j)$ (j=1+jmax) are also transmitted to the optimal operation control system 1C.

Figure 5:
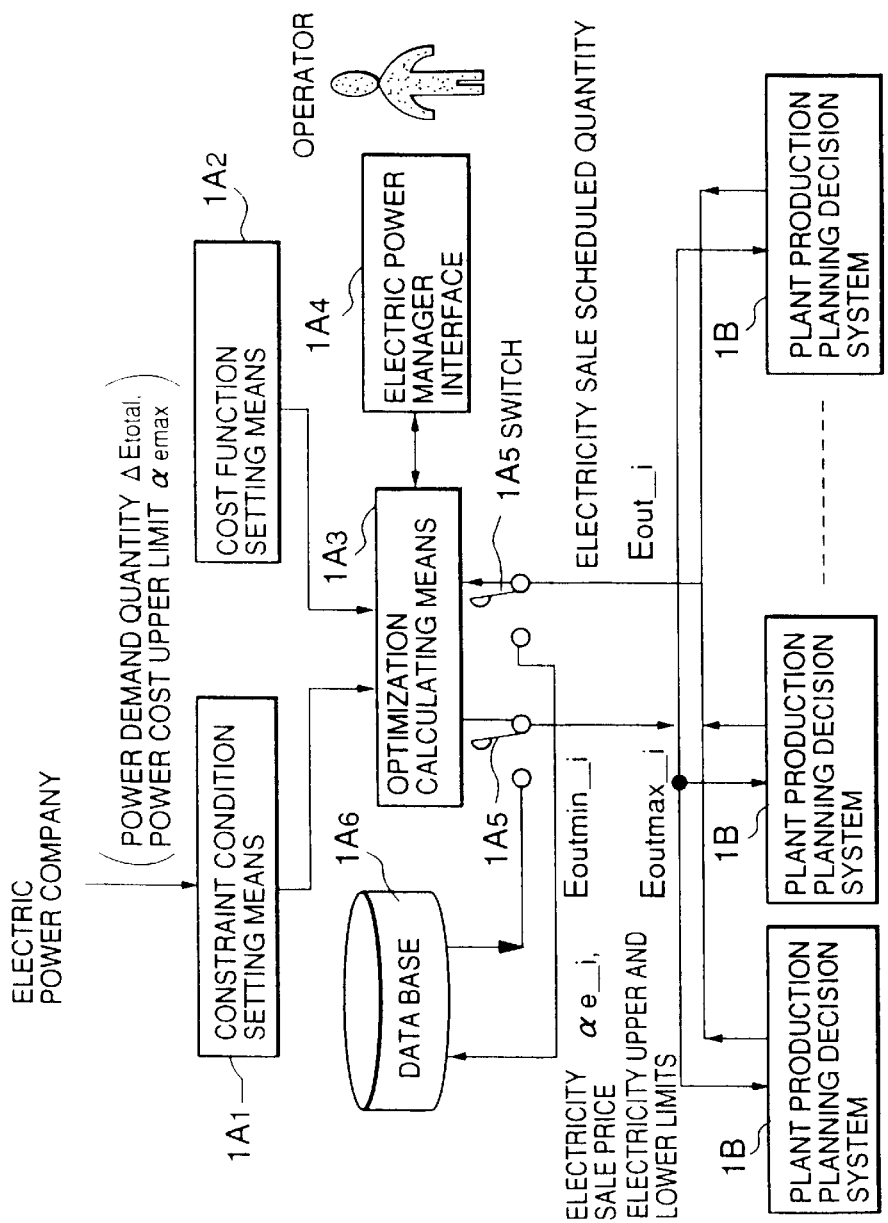
FIG. 5 is a block diagram showing an electricity trade cooperation system for the plant operation control system according to the present invention.
Figure 6A:
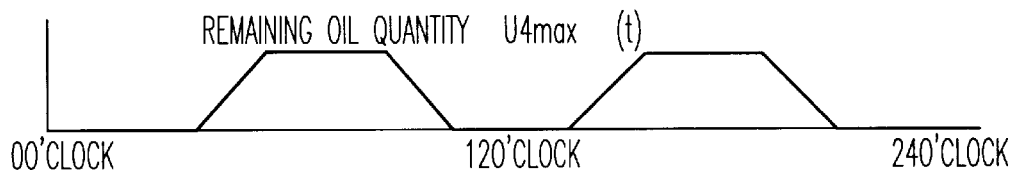
FIG. 6 is a timing chart showing an example of various operating condition patterns which change according to time on the basis of a production planning decision made by the plant operation control system according to the present invention.
Figure 6B:
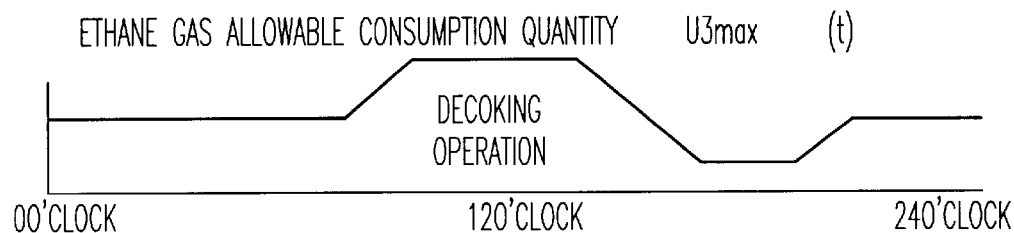
Figure 6C:
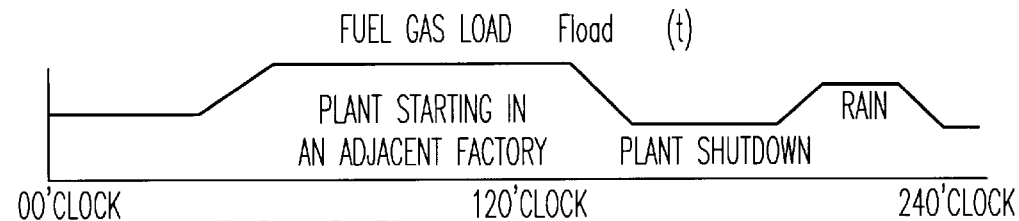
Figure 6D:
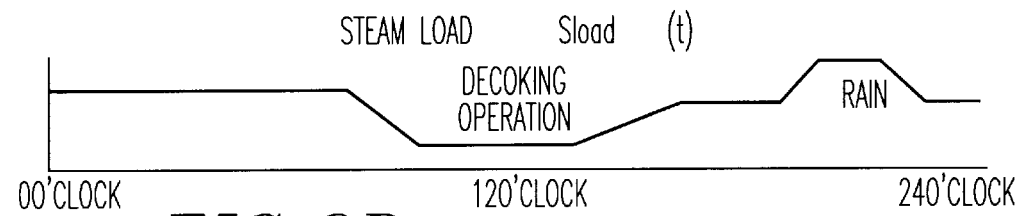
Figure 6E:
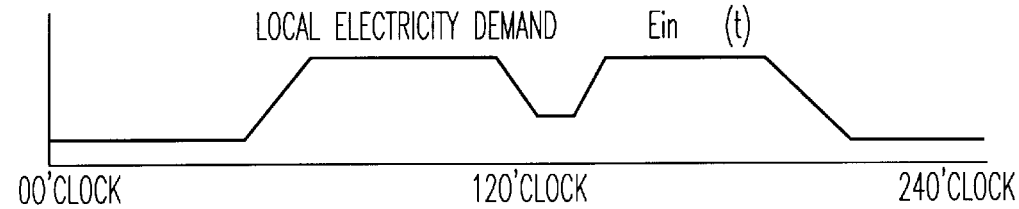
Figure 6F:
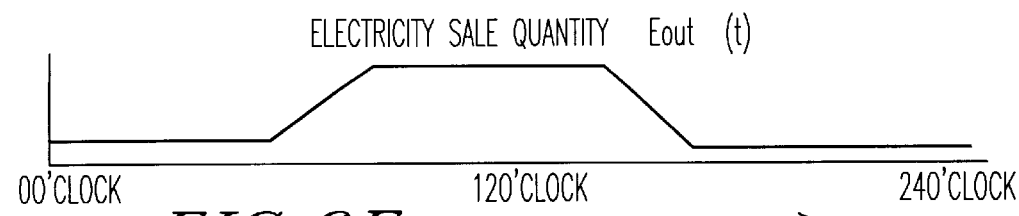

The electricity trade cooperation system 1A is described hereinbelow with reference to FIG. 5. In the plant operation control system 1, as shown in FIG. 1, the electricity trade cooperation system 1A is connected online to a plurality of the plant operation control systems 1B (for various types of plants, factories, or enterprises). In addition, the electricity trade cooperation system 1A is connected online to a central control room of an electric power company, to receive the total electric power demand quantity $E_{total}(k+j)$ of the electric power company and the electric power purchase cost upper limit $\alpha_{emax}(k)$ paid by the electric power company to secure the electric power (the same as the sale price of electricity for the plant).

Here, the constraint condition setting means 1A, prepares the following constraint conditions:

$$\sum_{i=1}^{imax} E_{out-i}(k+j) \geq E_{total}(k+j) \tag{13a}$$

$$\left| \sum_{i=1}^{imax} \Delta E_{out-i}(k+i) \right| \leq \Delta E_{total}(k+j) \tag{13b}$$

where $\Delta E_{out-i}(k+j) = E_{out-i}(k+j) - E_{out-i}(k+j-1)$ (14)

$$\sum_{i=1}^{imax} \sum_{j=1}^{jmax} \alpha_{e-1}(k+j) \cdot E_{out-i}(k+j) \leq \alpha_{max}(k)$$

$$\sum_{i=1}^{imax} \sum_{j=1}^{jmax} \alpha_{e-1}(k+j) \cdot E_{out-i}(k+j) - \text{minimized} \tag{15}$$

where $E_{out-1}$ denotes the electricity sale scheduled quantity of an i-th electric power generating source, and $\alpha_{e-i}$ denotes the sale price of electricity of the i-th electric power generating source. The above-mentioned constraint conditions imply that the total electricity sale quantity of the respective power generating sources exceeds the total electric power quantity $E_{total}$ demanded by the electric power company; that the rate of change of the total electricity sale quantity lies within the total electric power allowable rate of change width $\Delta E_{total}$; and that the total electricity sale cost paid to the respective electricity generating sources is lower than the maximum electric power cost $\alpha_{emax}$ allowable by the electric power company. Further, the above-mentioned cost function implies that the total sale price of electricity can be minimized.

The optimization calculating means $1A_3$ receives the above-mentioned restriction conditions and the evaluation function, and obtains the variables $\alpha_{e-1}(k+j)$ (i=1 to imax and j=1 to jmax), which can minimize the cost function under the noted constraint conditions. Here, the electricity sale scheduled quantity $E_{out-i}(k+j)$ of each electric power generating source is a non-linear function of variable $\alpha_{e-i}(k+j)$. Therefore, the evaluation is executed by a calculation based upon any one or a combination of the following steps:

(i) the sale price of electricity $\alpha_{e-i}$ is transmitted to the plant production planning schedule deciding system of each electric power generating source. In response thereto, each electricity sale scheduled quantity $E_{out-1}$ is received.

(ii) the electricity sale expected quantity $E_{out-i}$ corresponding to the sale price of electricity $\alpha_{e-i}$ is retrieved from a data base $1A_6$ for storing the actual past electricity sale results of each electric power generating source.

The above-mentioned items (1) and (2) are changed over by a switch $1A_5$. That is, the optimization calculations are executed in accordance with non-linear programming. A practical procedure for such non-linear programming is disclosed in "Non-linear programming" by Hiroshi KONNO and Hiroshi YAMASHITA, published by NIKKAGIREN (Japanese Science Technology Alliance), 1978, for instance.

Further, the convergence of the optimization calculations is displayed on the electric power manager interface $1A_4$, so that the operators can monitor the calculated results.

Further, the electricity sale quantity upper and lower limit values are determined based upon the sale price of electricity $\alpha_{e-i}(k+j)$ determined by the optimization calculating means $1A_3$, the electricity sale quantity expected value Eout-i corresponding thereto ($\alpha_{e-i}$), and the allowable change width $E_{rror}$ as follows:

$$E_{max-i}(i+k) = E_{out-i}(j+k) + E_{rror} \tag{16}$$

$$E_{min-i}(i+k) = E_{out-i}(j+k) + E_{rror} \tag{17}$$

Further, the electric power quantity upper and lower values are transmitted to the plant production planning schedule of each electricity generating source. The functions of the electricity trade cooperation system 1A have been described. A practical example of the plant operation control system according to the present invention will be explained with reference to FIGS. 6 to 8.

In FIG. 6, a graph (f) shows the sale price of electricity determined by the electricity trade cooperation system 1A, and the other graphs (a) to (e) show the scheduled times for various conditions over 24 hours as determined by the plant production planning deciding system 1B.

In this plant, three types of fuel gases, waste oil and coal are used as fuel. In FIG. 6, the graph (a) shows the allowable waste oil (fourth gas) consumption prediction quantity $U_{4max}$, in which the usable time zone is limited according to the production plant conditions. The graph (b) shows the allowable ethane (third gas) consumption prediction quantity $U_{3max}$, which changes on the basis of a prediction that the consumption quantity $U_{3max}$ is somewhat excessive during decoking in the cracking furnace, but somewhat insufficient following decoking (when restarted). The graph (c) shows the fuel gas load (demanded quantity) prediction value $F_{load}$ based upon the production planning schedule of the production plant, in which the load value $F_{load}$ is predicted to vary according to the plant start and plant shut down schedule of another adjacent factory. The graph (d) shows the steam load (demanded quantity) prediction value $S_{load}$, which drops for a time due to the decoking operation. Further, as shown by graphs (c) and (d), the fuel gas and steam load (demanded quantity) prediction values are increased by increasing the re-boiler output of each distillation tower on the basis of a weather forecast for rain that night. The graph (e) shows the local electric power prediction value $E_{ln}(t)$, which varies according to standard working hours. The graph (f) shows the electricity sale quantity $E_{out}$ transmitted from the electricity trade cooperation system 1A, in which the price is set on the assumption that electric power is at a premium in the daytime but experiences reduced demand at night.

Figures 7A, 7B, 7C, 7D, 7E:
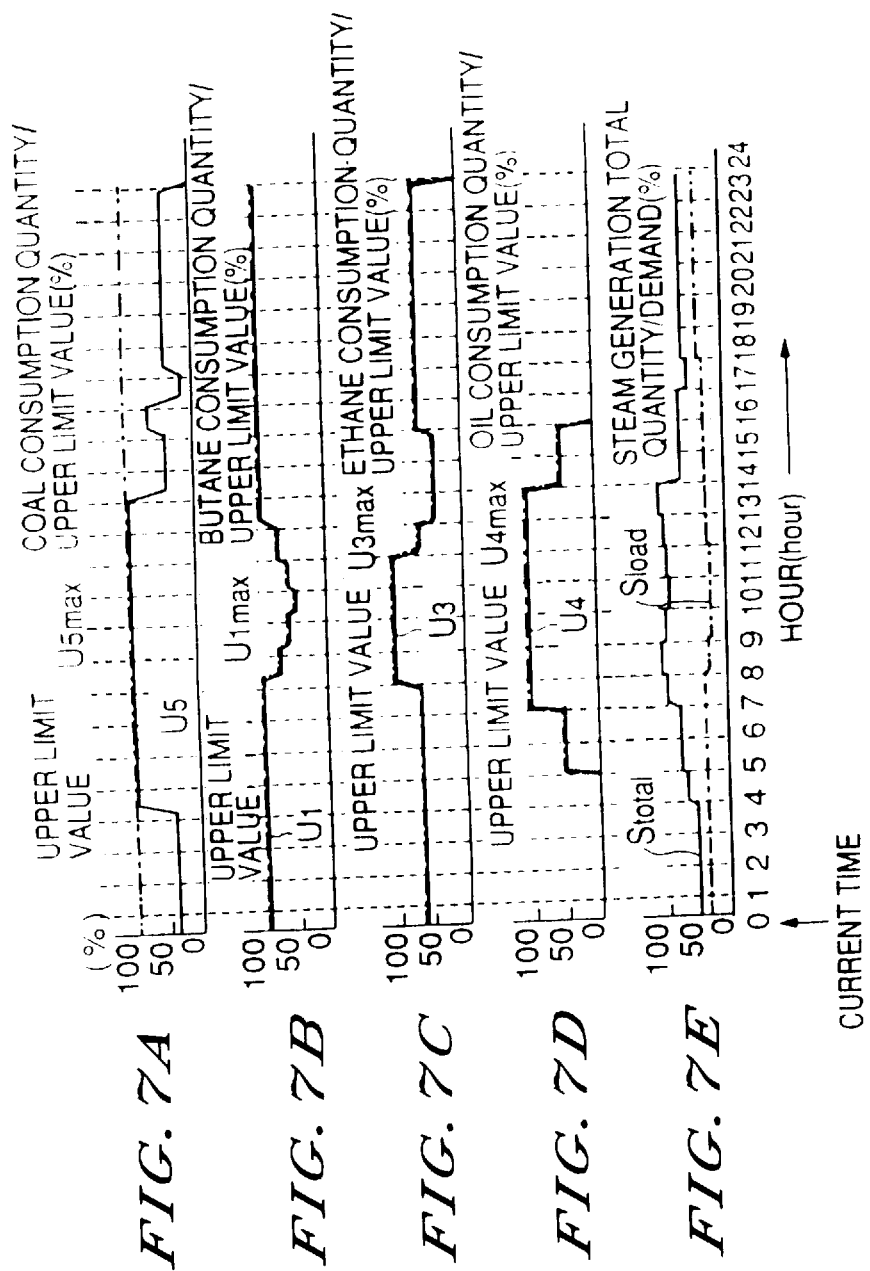
FIG. 7 is a timing chart showing an example of optimal energy distribution as calculated by the optimal operation control system of the plant operation control system according to the present invention.
Figures 7F, 7G, 7H, 7I, 7J:
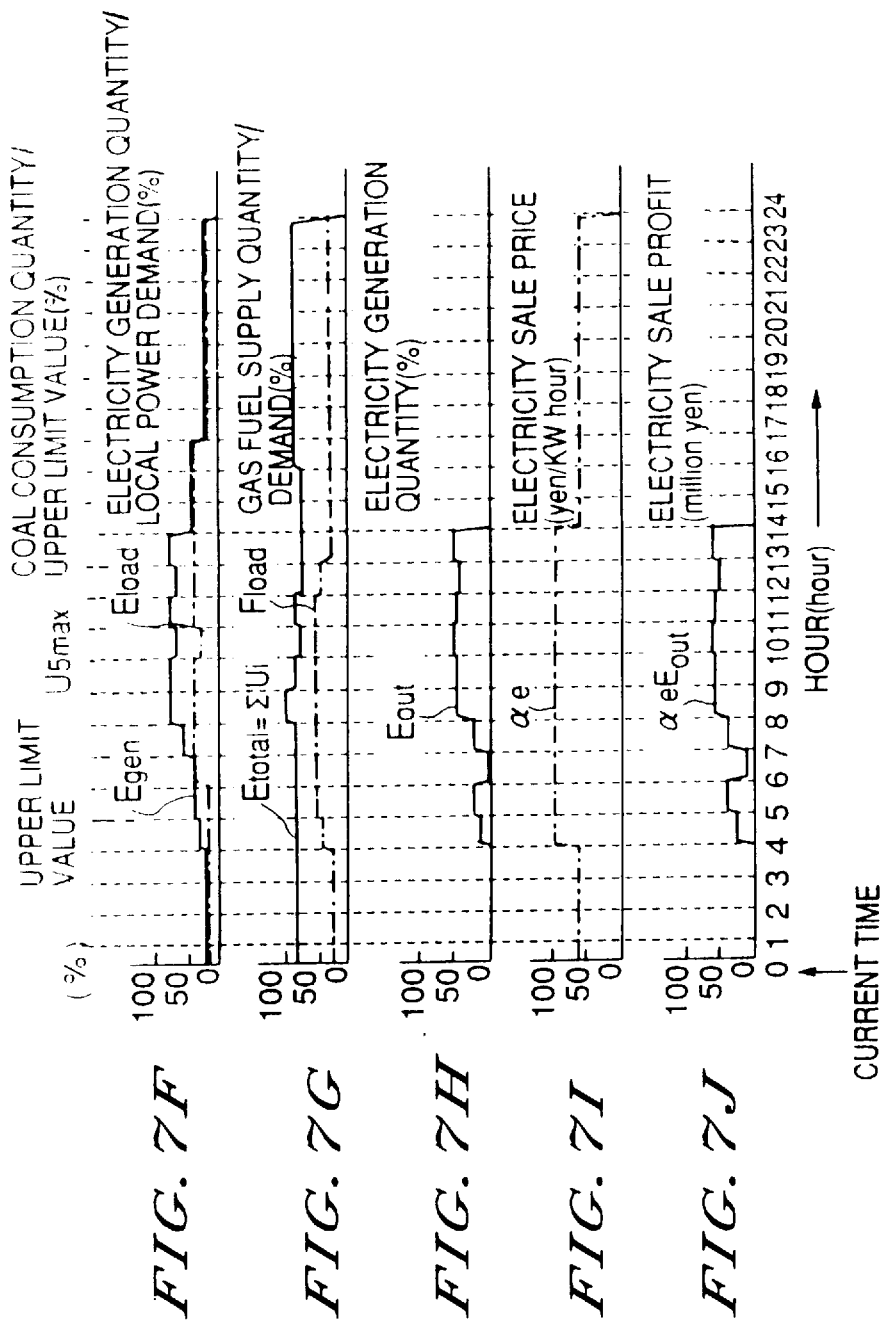

FIG. 7 shows the optimal distribution of each fuel gas consumption quantity, steam generation quantity, electricity generation quantity, electricity sale quantity for a 24 hour period, which can be calculated by the optimal operation control system 1C under the various conditions required for the production planning schedule. The graph (a) shows the coal fuel consumption quantity $U_5$ as a solid line and the upper limit value $U_{5max}$ as a dashed line, in which coal is consumed at the upper limit value only in daytime because that is when the electricity sale profit exceeds the unit cost of coal as a fuel. Coal usage is reduced as much as possible in other time zones to economize. The graph (b) shows a fuel gas (butane) consumption quantity $u_1$ as a solid line and the upper limit value $U_{2max}$ as a dashed line. This fuel gas is always consumed to the upper limit if possible, since it is a perfect byproduct whose cost is zero. The graph (c) shows the fuel gas (ethane) consumption quantity $U_3$ as a solid line and the upper limit value $U_{3max}$ as a dashed line. This fuel gas is also always consumed to the upper limit if possible, since it, too, is a perfect byproduct of zero cost. The graph (d) shows the waste oil consumption quantity $U_4$ as a solid line and the upper limit value $u_{4max}$ as a dashed line. This waste oil is also always consumed to the upper limit if possible, since it, too is a perfect byproduct of no cost. The graph (e) shows the steam generation quantity $S_{total}$ as a solid line and the steam load $S_{load}$ as a dashed line. Steam is used for generating electric power only in daytime when the electricity sale price is high. The graph (f) shows the electric power generation quantity $E_{gen}$ as a solid line and the local electric power load $E_{load}$ as a dashed line. The graph (g) shows the sum total of the supplied fuel gases $F_{total}=\Sigma u_i$ as a solid line and the fuel gas load $F_{load}$ for the production plant as a dashed line. The total consumption quantity of these fuel gases is determined on the basis of the upper limit decided by the production planning schedule because these are basically byproducts of low cost. The graph (h) shows the electricity sale quantity $E_{out}$, in which electric power is sold as much as possible during the daytime when the sale price of electricity is high but almost never sold at night when this sale price is low. The graph (i) shows the electricity sale price $\alpha_e$. The graph (j) shows the profit at each time obtained from the sale of electricity, in which the electricity sale profit $\alpha_e \cdot E_{out}$ is large during the daytime when the sale price of electricity is high in the same way as in the graph (h).

As described above, the energy can be distributed in a cycle of 24 hours so that fuel is saved and stored as much as possible at night (when sale price of the electricity is low) and steam and electric power generation are maximized to sell electricity in the daytime when the sale price of electricity is high. In other words, it is possible to realize a plant operation which can maximize the operational profit (electricity sale profit—fuel cost) by selling electricity, while satisfying the various demands for fuel gases, steam, and electric power on the production plant side.

FIG. 8 shows the actual fuel consumption quantity controlled by each unit control system 2 on the basis of each optimal energy distribution command value. In each unit control system, a model predictive control method is adopted which includes a detailed dynamic characteristic model for each plant unit to predict by calculation each control variable value for a future time. In addition, each unit control system is controlled on the basis of sequential optimization calculations so that the calculated control variable predicted value can follow the above-mentioned command value (the future desired value) under optimization conditions. The control operations (the control variable prediction calculation and the manipulated variable optimization calculation) are advantageously executed at a period of one minute. Further, the prediction calculation is made and corrected each minute for about 30 min. The unit control system adjusts the consumption quantity of each fuel (such as coal, waste oil, butane gas, and ethane gas) for each boiler and the control variables are the gas pressure of the fuel gas line and the stream pressure of the stream line.

FIG. 8 shows the response characteristics for each variable, in which a vertical solid line indicates the current time, the left side indicates a past response historical trend curve, and the right side measured from the current time line indicates a future response historical trend curve. The graph (a) indicates the fuel gas line pressure (solid line) following a given set-point value (dashed line). The graph (b) indicates the steam line pressure (solid line) being maintained at a constant value following a given set-point value (dashed line). The graph (c) indicates the status in which the actual coal consumption quantity $/u_5$ (solid line) follows the coal consumption quantity command value $u_5$ (dashed line) received by the optimal operation control system 1C. Here, since the limitation of fuel change rate according to the boiler operating conditions is considered, a sudden following operation can be prevented. In the same way, the graph (d) indicates the status in which the actual ethane gas consumption quantity $/u_1$ (solid line) follows the ethane gas consumption quantity command value $u_1$ (dashed line) received by the optimal operation control system 1C. Further, in the same way, the graph (e) indicates the status in which the actual butane gas consumption quantity $/u_1$ (solid line) follows the butane gas consumption quantity command value $u_1$ (dashed line) received by the optimal operation control system 1C.

As described above, each unit control system 2 executes control so as to find a point of compromise between two control operations. Here, the two control operations are (1) to allow each variable to follow each variable command value given by the optimal operation control system 1C (the upper system), and (2) to control each process quantity (fuel gas pressure, steam pressure, for example) at as close to a constant value as possible.

Finally, the operation of the plant operation control system according to the present invention can be somewhat modified. In the plant operation control system, the electricity sale cooperation system determines the sale price of electricity by minimizing the total electricity sale cost under such conditions that the given electric power demands can be satisfied. On the other hand, the plant production planning schedule determining system determines the electricity sale quantity by maximizing the electricity sale profit relative to a given electricity sale price. These operations are minimax problems for minimizing the electricity sale cost or for maximizing the electricity sale profit. In other words, it is possible to represent this problem as an optimization problem as follows:

$$\min_{\alpha_{e-i}} \max_{E_{out-i}} \text{(power sale cost)} \quad (18)$$

As a result, it is possible to decide the optimal electricity sale quantity distribution in such a way that the operation at the highest possible profit can be realized for each plant and, on the other hand, the electric power of the lowest possible price can be supplied as a whole.

In the optimal operation control system 1C according to the present invention, since the surplus energy of various production plants can be used effectively for generating electricity and selling it, it is possible to reduce plant operating cost and to protect the environment owing to the energy saving effect. In particular, since optimal control can be executed considering the plant production planning schedule and predicted energy demand, energy loss can be minimized without causing an abrupt change in any plant operation. In addition, since plant operation is controlled by performing regularly occurring calculations, it is possible to correct any unbalance in energy supply with a high response speed, whenever the plant operating conditions and/or environment conditions vary.

Further, in the plant production planning decision system 1B according to the present invention, since the plant production planning schedule can be adjusted under optimal conditions in correspondence to the variation cycle of the sale price of electricity and the electricity sale demand quantity of the electric company, it is possible to establish the production planning schedule so as to maximize the electricity sale profit, while keeping the production profit at almost the same level as before. Further, the plant operators can adjust the optimal production planning in schedule a dialogical (interactive) manner, and they can further confirm the effectiveness thereof by evaluating a simulation thereof.

As a result, it is possible to smooth the energy consumption quantity for a local area, by synchronizing plant production demands with the electric power demand variation of the local area so that they are of opposite phase.

Further, in the electricity trade cooperation system 1A of the present invention, since the electricity sale quantity of the local area including a plurality of factories and production plants can be adjusted so as to follow the electric power demand of an electric company or the local area, it is possible to smooth the balance between electric power demand and supply. In particular, even when the electricity generation quantity or the electricity sale quantity of each production plant is small and fluctuates violently, it is possible to supply the electric power stably and smoothly in combination from a plurality of plants (electric power generating sources), so that it is possible to allow the production plants to perform the same function as with the case of the ordinary electric power generating plant for supplying electric power to the local area.

Figure 9:
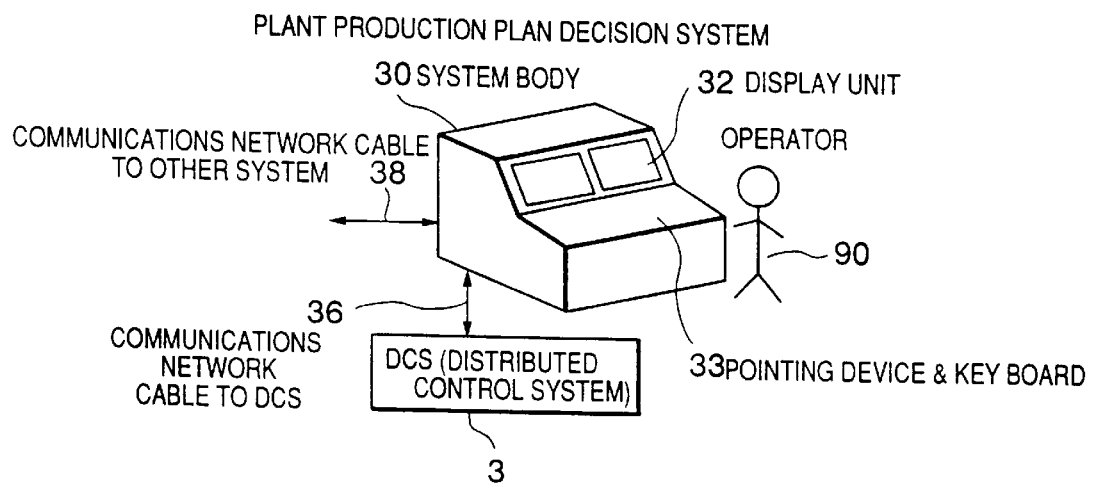
FIG. 9 is a perspective view showing a second embodiment of the plant production planning decision system according to the present invention.

A second embodiment of the plant production planning schedule determining system will be described hereinbelow with reference to FIGS. 9 and 10. Being different from the first embodiment shown in FIG. 4, this second embodiment of the plant production planning decision system can be utilized independently, as shown in FIG. 9. In more detail, the plant production planning decision system is composed of a system body 30, a display unit 32 for displaying various operating conditions and alarms for the operators 90, and an input device 33 such as a keyboard or pointing device, for example. In addition, the system is provided with an interface (not shown) between the system body 30 and a communications network cable 38 for transmitting and receiving various data to and from the other similar decision systems and another interface (not shown) between the system body 30 and another communications network cable 36 connected to a distributed control system DCS. Further, as these communication network cables, any communicating means (for example, public lines, radio lines, satellite communications, or optical communications) can be used, whether of synchronous or asynchronous communications type.

Figure 10:
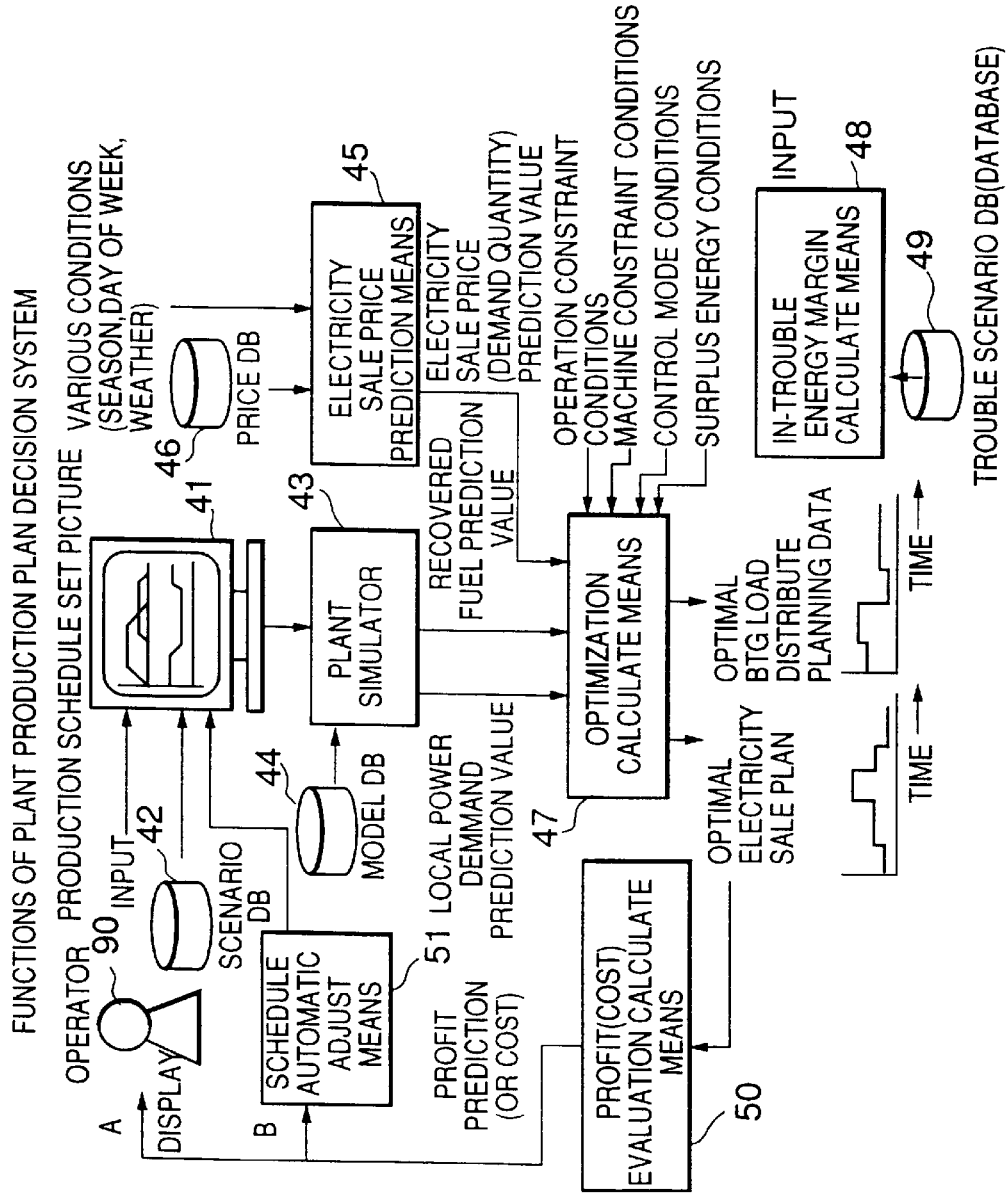
FIG. 10 is a block diagram showing the system construction of the plant production planning decision system shown in FIG. 9.

FIG. 10 is a block diagram showing the plant production planning schedule determining system. The respective functions of this system are described below. The operators 90 can prepare an optimal schedule (operation planning data) in a dialogical manner with a production schedule setting picture 41. Further, the operators 90 input plant production planning data manually or by selecting the data from a scenario data base 42 of stored operation scenarios.

A plant simulator 43 inputs a static plant characteristics model (for example, a mass balance model or an energy balance model) from a model data base 44, and calculates demand prediction data related to local power sources (for example, electric power, steam, various fuels, or refrigerants) and generation quantity prediction values of fuels reproduced in the plant (for example, blast furnace gas BFG or coke oven gas COG and the like, in the case of a steel industry plant), all extending from the present to the future, on the basis of the set plant operation planning data.

Further, electricity sale price prediction means 45 inputs various data related to the power fluctuation factors (for example, season, day of the week, and weather conditions) and calculates the prediction values of the electricity sale price fluctuations extending from the present to the future by searching electricity sale prices under similar conditions stored in an electricity sale price data base 46 related to the past electricity sale prices. As an alternative, the future fluctuation prediction value of the electricity sale demand quantity can be calculated instead of the electricity sale price.

On the basis of this prediction value data extending from the present to the future, such as the local power source demand prediction values, reproduced fuel prediction values, electricity sale price data (or demand quantity data), an optimization calculating means 47 calculates an optimal electricity sale planning, an optimal load distribution planning for each unit (for example, boilers, turbines, and generators). The practical calculating methods are the same as with the expressions (1) to (12) in the first embodiment.

Further, the optimization calculating means 47 calculates the optimal conditions by considering various data inputted from the outside, such as the various plant variables which are the operation constraint conditions for regulating the lower limits of the production quantity and quality, the machine constraint conditions such as the electricity generation quantity constraint and the steam quantity constraint for each unit, the control mode conditions such as operation mode changes due to trouble with a part of one of the machines, and the minimum surplus energy conditions of the total steam generation quantity and the electricity generation quantity extending from the present to the maximum value.

Further, in-trouble surplus energy calculating means 48 calculates the surplus energy conditions which can satisfy such conditions that the total electricity generation quantity is larger than the electricity generation demand quantity, the total steam generation quantity is larger than the steam demand quantity, the fuel consumption quantity for each unit is smaller than the fuel consumption upper limits in accordance with a trouble scenario selected from the trouble scenario data base 49 which stores scenarios to be performed in case of troubles like those of representative past machine troubles, and inputs the calculated surplus energy conditions to the optimization calculating means 47, where necessary.

On the basis of the optimal electricity sale planning data and the optimal load distribution planning data (for boilers, turbines, generators, for examples), all calculated by the optimization calculating means 47, a profit (or cost) evaluation calculating means 50 calculates the plant production profit, the electricity sale profit, and the like, and displays the calculated results on the operator terminals (display unit). On the basis of the displayed results, the operators 50 can adjust the plant operation schedule using a trial and error method.

In addition to the above-mentioned functions, an automatic schedule adjusting means 51 can optimize the schedule automatically. For instance, when the addition of the production profit and the electricity sale profit is required to be maximized with the operation time of a plant as a variable, since the evaluation function is:

Maximization: total profit=
operation profit (operation time)
+electricity sale profit (surplus electric power (operation time))

which results in a non-linear optimization problem, it is possible to obtain the maximum operating time automatically in accordance with an appropriate method such as a gradient method, for instance. Further, the above-mentioned description of "operation profit (operation time)" indicates that "the operation profit" can be represented by a non-linear function of "the operation time".

Some examples of the pictures displayed on the display unit of the plant production planning decision system of this second embodiment will be explained with reference to FIGS. 11A to 11D and FIGS. 12A to 12D.

The reference numeral 61 shown in FIG. 1A denotes a picture displaying the predicted values of the electricity sale price (or the electricity purchase price) calculated by the electricity sale price predicting means 45.

Therefore, this picture indicates the information relative to the energy.

Figure 11A:
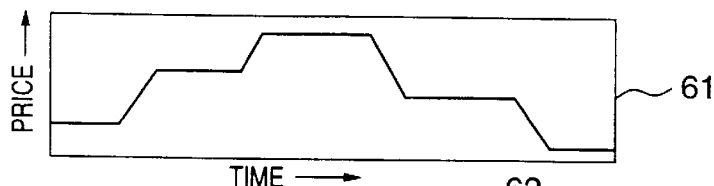
FIGS. 11A to 11D are illustrations explaining examples of displayed pictures used for the embodiment shown in FIG. 10.
Figure 11B:
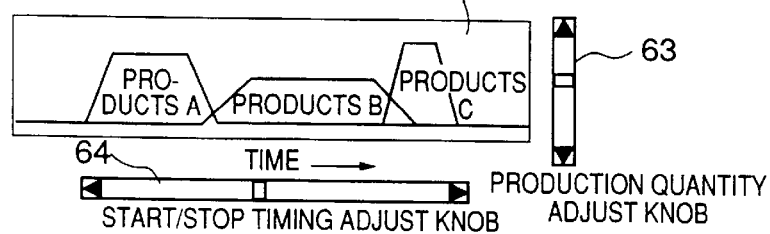

The reference numeral 62 shown in FIG. 11B denotes a picture used for the operators to prepare and adjust the plant production schedule in a dialogical manner. The operation planning data, such as the production quantity of a specific plant, can be adjusted by use of a production quantity adjusting knob 63 and a start/stop timing adjusting knob 64 both shown in FIG. 11B.

Therefore, this picture indicates requirement contents related to the schedule for producing the products.

Figure 11C:
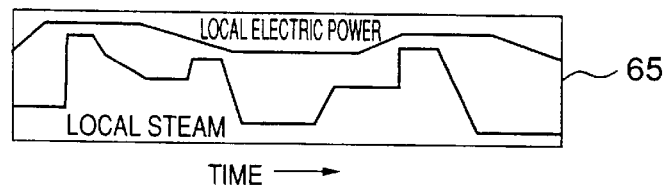

The reference numeral 65 shown in FIG. 11C denotes a picture displaying the local power source generation predicted values calculated by the plant simulator 43.

Figure 11D:
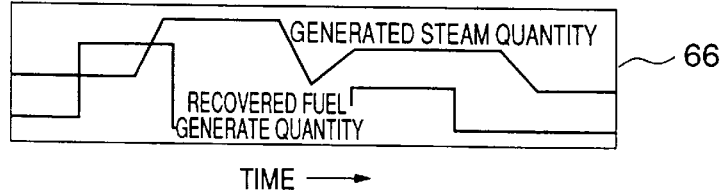

The reference numeral 66 shown in FIG. 11D denotes a picture displaying the predicted value data of the reproduced energy generation quantities of the calculated reproduced fuels, surplus steam, refrigerants, and the like.

Therefore, these two pictures indicate the production schedule of the energy together with the production schedule of the products.

The reference numeral 71 shown in FIG. 12A denotes a picture displaying the optimal electricity sale planning data calculated by the optimization calculating means 47.

The reference numeral 72 shown in FIG. 12A denotes a picture displaying the prediction values of the electricity sale profit, the fuel cost, the production profit, and the like, all calculated by the profit evaluation calculating means 50.

Therefore, these two pictures also indicate the information relative to the energy.

The reference numeral 73 shown in FIG. 12B denotes a picture displaying the surplus energy quantities (surplus electric power quantity, surplus steam quantity, surplus fuel quantity (accumulated fuel quantity) and the like) all calculated by the in-trouble surplus energy calculating means 48 in accordance with the trouble mode previously set or selected from the trouble scenario data base 49.

Therefore, this picture indicates requirement contents related to schedule required to adjust the energy production schedule on the basis of the displayed information relative to the energy.

The reference numeral 74 shown in FIG. 12B denotes a picture used to select one of a plurality of representative trouble modes. In accordance with the selected trouble mode, the in-trouble surplus energy calculating means 48 calculates the surplus energy for securing the needed electricity sale quantity, the steam quantity and the fuel quantity all under the selected trouble conditions.

The reference numeral 75 shown in FIG. 12C denotes a picture used to switch and manage the electricity sale operation modes. This is referred to as an electricity sale mode managing function, by which the operators can select any one of the following operation modes:

Operation mode 1: a designated quantity of electricity is sold compulsorily.

Operation mode 2: a local electric power requirement is supplied on the basis of local generated electricity, without selling electricity.

Operation mode 3: a plant is operated by purchasing a quantity of electricity.

Operation mode 4: Any optimal mode can be set automatically from the above three modes of the electricity sale mode, the local electricity use mode without selling electricity, and the electricity purchase mode.

Here, when the operation mode 1 is selected, the restriction condition is set automatically as follows:

Electricity sale quantity=set-point value or

Electricity sale quantity$\geq 0$

When the operation mode 2 is selected, the constraint condition is set automatically as follows:

Electricity sale quantity=0

When the operation mode 3 is selected, the constraint condition is set automatically as follows:

Electricity sale quantity$\leq 0$

Therefore, when the operation mode 4 is selected, the constraint condition related to the electricity sale quantity can be released. This constraint condition is used by the optimization calculating means 47 shown in FIG. 10.

Therefore, this picture indicates requirement contents required to output the energy outside of the plant according to the adjusted energy production schedule.

The reference numeral 76 shown in FIG. 12D denotes a picture used to set or change the cost functions such as the coefficients (fuel unit price, or the like) of the expression (9), the upper and lower limits of the constraint conditions, the energy conversion efficiency coefficients of boilers, turbines, electric power generators, and the like, which are all used by the optimization calculating means 47 for an optimization calculation.

Further, when each plant production planning schedule is adjusted, respectively, by the operators using the sliders of the knobs 63 and 64 (shown in FIG. 11B) and the pointing device, while watching the picture 62, since the various functions of the system shown in FIG. 10 are operated in cooperation with each other, the calculated results of the system can be immediately displayed on all the pictures 65 to 76, respectively. Therefore, the operators can decide the optimal production schedule, while confirming the various prediction values of the plant operating situations, the surplus energy quantity, the final profit, and the like.

Figure 13:
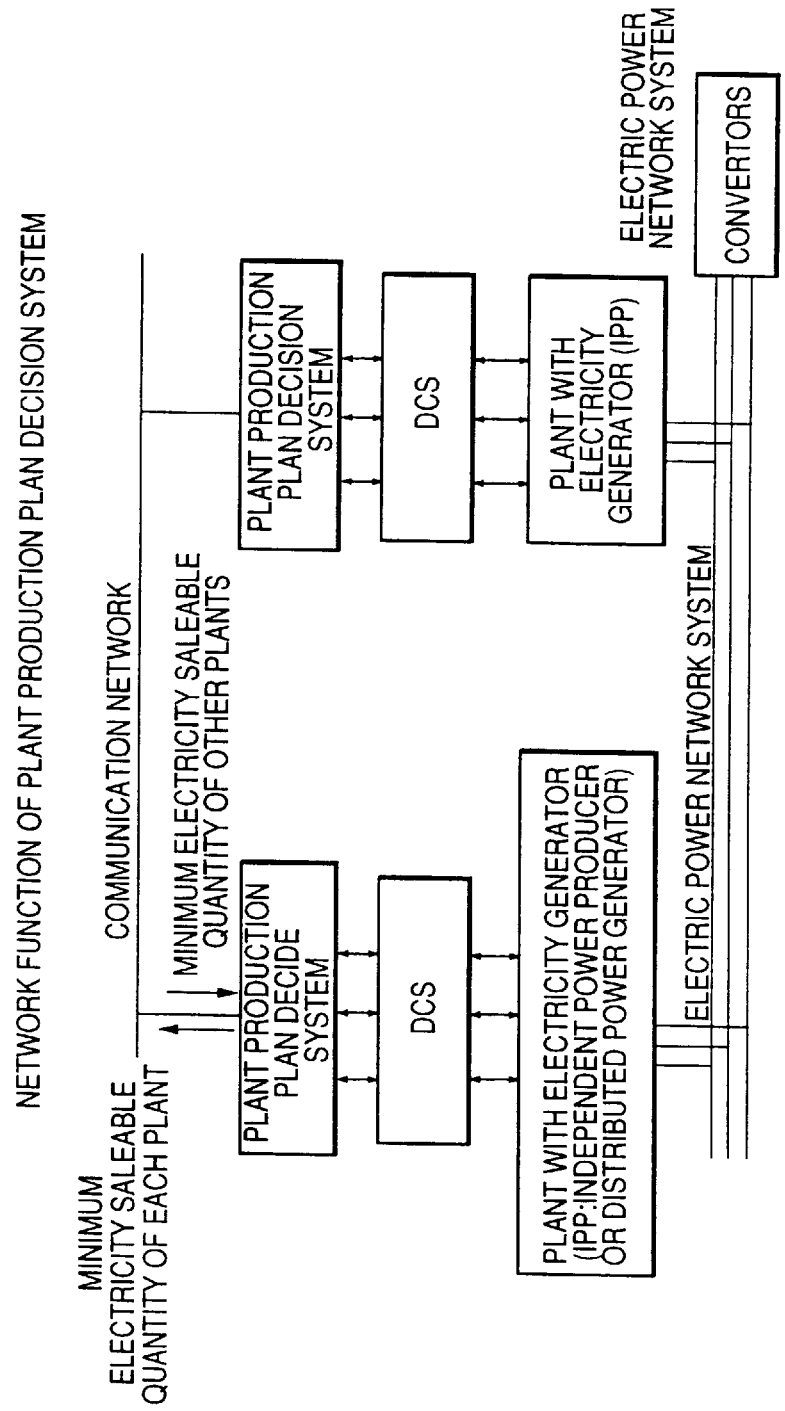
FIG. 13 is an illustration explaining the network function of the plant production planning decision system according to the present invention.

A network function of the plant production planning deciding systems of the present invention will be described hereinbelow with reference to FIG. 13.

As shown in FIG. 9, the plant production planning schedule deciding system is provided with a mutual communications function with other similar plant reproduction planning schedule deciding systems. Therefore, as shown in FIG. 13, n-units of the plants, each having electricity generating functions are connected via power systems. Therefore, when electric power can be supplied mutually, n-units of the plant production planning schedule deciding systems are provided for each plant and then connected to each other through communications lines. In this case, the systems are each provided so as to transmit or receive the following data to and from the other remaining (n−1)-unit plant production planning schedule deciding systems in real time:

(1) Function for receiving the minimum electricity saleable quantity of the other plants.

In this function, the minimum electricity saleable quantity of each plant transmitted by the other systems can be received. Therefore, it is possible to calculate the lower limit of the total electricity sale quantity supplied by the other (n−1)-unit plants. On the basis of the calculated total electricity sale quantity of the other plants, the system can calculate the electricity sale quantity for its own plant under the worst conditions (which must be supplied to an electric power company to satisfy the electricity sale quantity of the whole n-unit plants) is calculated as a difference in electricity sale quantity between the other (n−1)-unit plants and its own plant as follows:

Necessary electricity sale quantity at the worst=electricity sale lower limit quantity—$\Sigma$ (minimum electricity saleable quantity of the other plants).

Here, $\Sigma$ implies the addition of the electricity sale quantities of the other (n−1)-unit plants.

Therefore, the surplus energy conditions are set to the optimization calculating means 47 in such a way that the necessary electricity sale quantity under the worst condition is calculated as described above. Therefore, the optimization calculating means 47 calculates the maximum realizable electricity sale quantity on the set production planning schedule. When the calculated maximum realizable electricity sale quantity is less than the necessary electricity sale quantity under the worst conditions, an alarm message indicative of that the surplus energy is not sufficient is displayed on the picture of the display unit for the operators.

(2) Function of transmitting the minimum electricity saleable quantity under of trouble conditions.

The in-trouble surplus energy calculating means 48 calculates the electricity saleable quantity with respect to all the trouble scenarios stored in the trouble scenario data base 49, and transmits the calculated results to the other systems in real time.

On the basis of the data network communication functions as described above, it is possible to prepare the plant operation planning in such a way that the necessary minimum electricity sale quantity can be secured relative to all of the plants, under due consideration of the worst cases, that is, under consideration of plant trouble. Further, owing to the above-mentioned data network communications, it is possible to realize the same functions as with the case of the first embodiment of the electricity sale cooperation control system which can serve as an upper system.

As described above, in the plant operation control system according to the present invention, the operators can increase the efficiency of the plant production activity, while contributing to environmental protection.

Further, the operators can prepare, correct, and confirm the optimal production schedule effectively in dialogical or interactive manner with the data displayed on the display unit, while confirming various data such as the plant operation profit prediction values including the profit by the electricity sale, the surplus energy at home plants, and the like.

Further, the operators can manage the plants easily in accordance with the operators' decision, considering priority as to whether the plant operation must be controlled to increase the production profit or the electricity sale profit, on the basis of the electricity sale mode managing function.

Further, the operator can prepare the plant operation planning in such a way that the necessary minimum electricity sale quantity can be secured relative to all of the plants, considering the mutual worst situations of the respective plants, such as in case of trouble, on the basis of the data communications between the systems.

Further, the above-mentioned function according to the present invention can be obtained in accordance with yet another method. For instance, any desired operation control in the plant can be realized by storing the function representative thereof in a magnetic or optical medium as software which can be installed on and run by a computer. In other words, it is possible to obtain a similar effect relative to the plant operation control method according to the present invention in accordance with software stored in a recording medium which is then run by a computer.

What is claimed is:

1. A plant operation control system, comprising:
   means for producing energy in a plant;
   means for producing products in the plant by use of the energy produced by said energy producing means;
   means for scheduling energy production on the basis of production schedule of the products;
   means for adjusting the energy production scheduled by said energy production scheduling means on the basis of information relative to the energy; and
   means for outputting the energy outside of the plant according to the energy production schedule adjusted by said energy production adjusting means.

2. The plant operation control system of claim 1, wherein said energy production schedule adjusting means adjusts the energy production scheduling means on the basis of energy value data.

3. The plant operation control system of claim 2, wherein said energy production schedule adjusting means adjusts the energy production scheduling means on the basis of energy price data.

4. The plant operation control system of claim 3, wherein said energy production schedule adjusting means outputs a command value for maximizing a total profit of both an energy sale profit and an product sale profit.

5. The plant operation control system of claim 3, wherein said energy production schedule adjusting means can adjust the energy production schedule according to fluctuations of the energy sale price.

6. The plant operation control system of claim 3, wherein said energy production schedule adjusting means comprises means for predicting the energy sale price.

7. The plant operation control system of claim 1, wherein said energy production schedule adjusting means comprises means for considering at least one of plant operating conditions, operation constraint, possible trouble conditions, and surplus energy conditions.

8. The plant operation control system of claim 1, wherein said energy production scheduling means comprises means for predicting an energy quantity required for producing the products.

9. The plant operation control system of claim 1, wherein said energy production scheduling means comprises means for predicting an energy quantity reproduced or recovered in the plant.

10. The plant operation control system of claim 1, wherein the energy is electrical energy.

11. A plant operation control method of producing products in a plant by use of energy generated within the plant, comprising:
    a first step of setting an energy production schedule on the basis of a production schedule of the products;
    a second step of adjusting the energy production schedule set in the first step on the basis of energy-related data; and
    a third step of outputting part of the energy generated within the plant to the outside of the plant, according to the energy production schedule adjusted in the second step.

12. The plant operation control method of claim 11, wherein said second step includes adjusting the energy production schedule on the basis of energy value data.

13. The plant operation control method of claim 12, wherein said second step includes adjusting the energy production schedule on the basis of energy sale price data.

14. The plant operation control method of claim 13, wherein said second step further includes outputting a command value for maximizing a total profit of both an energy sale profit and a product sale profit.

15. The plant operation control method of claim 13, wherein said second step includes adjusting the energy production schedule according to fluctuations of the energy sale price.

16. The plant operation control method of claim 13, wherein said second step further includes predicting the energy sale price.

17. The plant operation control method of claim 11, wherein said second step further includes considering at least one of plant operating condition, operation constraint, possible trouble conditions, and surplus energy conditions as part of said energy related data.

18. The plant operation control method of claim 11, wherein said second step further includes predicting an energy quantity required for producing the products.

19. The plant operation control method of claims 11, wherein said second step further includes predicting an energy quantity reproduced or recovered in the plant.

20. The plant operation control method of claim 11, wherein the energy is electrical energy.

21. The plant operation control system of claim 1, wherein said energy production schedule adjusting means regulates the production schedule of the products to adjust the energy production schedule.

22. A plant operation control system, comprising:

an energy producer producing energy in a plant;

a product producer producing products in the plant by use of the energy produced by said energy producer;

an energy production scheduler scheduling energy production on the basis of a production schedule of the products;

an adjuster adjusting the energy production scheduled by said energy production scheduler on the basis of information relative to the energy; and an energy outputter outputting the energy outside of the plant according to the energy production schedule adjusted by said adjuster.

23. The plant operation control system of claim 22, wherein said adjuster adjusts the energy production scheduler on the basis of energy value data.

24. The plant operation control system of claim 23, wherein said adjuster adjusts the energy production scheduler on the basis of energy price data.

25. The plant operation control system of claim 24, wherein said adjuster outputs a command value for maximizing a total profit of both an energy sale profit and a production sale profit.

26. The plant operation control system of claim 24, wherein said adjuster adjusts the energy production schedule according to fluctuations of the energy sale price.

27. The plant operation control system of claim 24, wherein said adjuster comprises a prediction section predicting the energy sale price.

28. The plant operation control system of claim 22, wherein said adjuster comprises a consideration section considering at least one of plant operating conditions, operation constraint, possible trouble conditions, and surplus energy conditions.

29. The plant operation control system of claim 22, wherein said energy production scheduler comprises a prediction section predicting an energy quantity required for producing the products.

30. The plant operation control system of claim 22, wherein said energy production scheduler comprises a prediction section predicting an energy quantity reproduced or recovered in the plant.

31. The plant operation control system of claim 22, wherein the energy is electrical energy.

* * * * *